US010286591B2

(12) United States Patent
Tabata et al.

(10) Patent No.: US 10,286,591 B2
(45) Date of Patent: May 14, 2019

(54) BLOW MOLDING MOLD

(71) Applicants: Shinichi Tabata, Tokyo (JP);
Toshimasa Tanaka, Tokyo (JP)

(72) Inventors: Shinichi Tabata, Tokyo (JP);
Toshimasa Tanaka, Tokyo (JP)

(73) Assignee: DISCMA AG, Hünenberg (CH)

( * ) Notice: Subject to any disclaimer, the term of this patent is extended or adjusted under 35 U.S.C. 154(b) by 151 days.

(21) Appl. No.: 15/039,253

(22) PCT Filed: Nov. 5, 2014

(86) PCT No.: PCT/JP2014/005577
§ 371 (c)(1),
(2) Date: May 25, 2016

(87) PCT Pub. No.: WO2015/079627
PCT Pub. Date: Jun. 4, 2015

(65) Prior Publication Data
US 2017/0100873 A1    Apr. 13, 2017

(30) Foreign Application Priority Data

Nov. 28, 2013   (JP) ................................. 2013-246216

(51) Int. Cl.
*B29C 49/46*       (2006.01)
*B29C 49/48*       (2006.01)
(Continued)

(52) U.S. Cl.
CPC .............. *B29C 49/48* (2013.01); *B29C 49/12* (2013.01); *B29C 49/46* (2013.01); *B65B 3/022* (2013.01);
(Continued)

(58) Field of Classification Search
CPC . B29C 2049/4664; B29C 49/46; B29C 49/48; B29C 49/4273
See application file for complete search history.

(56) References Cited

U.S. PATENT DOCUMENTS 3,570,057 A * 3/1971 Doyle ..................... B29C 49/48
                                                    425/522
3,892,829 A    7/1975 Uhlig
(Continued)

FOREIGN PATENT DOCUMENTS

CN       102089142 A    6/2011
EP           2799208 A1    11/2014
(Continued)

OTHER PUBLICATIONS

Jan. 24, 2017 Office Action issued in Chinese Patent Application No. 201480064986.7.
(Continued)

*Primary Examiner* — Robert B Davis
(74) *Attorney, Agent, or Firm* — Oliff PLC

(57) ABSTRACT

A blow molding mold is adapted to be mounted to a blow molding device and having a cavity surface. The blow molding device has a pressurized liquid supply function of supplying a pressurized liquid to stretch the preform toward the cavity surface and also has a head space defining function of defining head space in the container by drawing back a part of the liquid filled into the container through a blow nozzle or by withdrawing a stretching rod from the container filled with the liquid. The cavity surface includes a bottom forming surface, a trunk forming surface, a shoulder forming surface, and a mouth forming surface, and the trunk forming surface includes a flattened portion that, in the transverse section, has a flattened shape.

8 Claims, 10 Drawing Sheets

(51) Int. Cl.
- *B29C 49/12* (2006.01)
- *B65B 3/02* (2006.01)
- *B29C 49/06* (2006.01)
- *B29C 49/58* (2006.01)
- *B29C 49/78* (2006.01)
- *B29K 67/00* (2006.01)
- *B29L 31/00* (2006.01)

(52) U.S. Cl.
CPC .............. *B29C 49/06* (2013.01); *B29C 49/58* (2013.01); *B29C 49/783* (2013.01); *B29C 2049/4664* (2013.01); *B29K 2067/003* (2013.01); *B29L 2031/7158* (2013.01)

(56) References Cited

U.S. PATENT DOCUMENTS

| | | | | |
|---|---|---|---|---|
| 4,056,138 | A * | 11/1977 | Fagniart | B29C 49/04 383/120 |
| 4,905,450 | A * | 3/1990 | Hansen | A61J 1/10 53/410 |
| 5,122,327 | A * | 6/1992 | Spina | B29C 49/30 215/381 |
| 5,383,577 | A * | 1/1995 | Prahs | B29C 49/48 222/107 |
| 5,736,168 | A * | 4/1998 | Goyal | B29C 33/306 249/102 |
| 6,637,613 | B2 * | 10/2003 | Shimada | B65D 1/0223 215/382 |
| 7,744,365 | B2 * | 6/2010 | Maddox | B29C 49/42 425/522 |
| 8,409,490 | B2 * | 4/2013 | Shimizu | B29C 49/649 264/500 |
| 8,727,152 | B2 * | 5/2014 | Strasser | B65D 1/0223 215/381 |
| 2011/0135778 | A1 * | 6/2011 | Andison | B29C 49/46 425/524 |
| 2015/0328823 | A1 * | 11/2015 | Kannengiesser | B29C 49/12 206/525 |

FOREIGN PATENT DOCUMENTS

| | | |
|---|---|---|
| EP | 3075517 A1 | 10/2016 |
| JP | S62-138226 A | 6/1987 |
| JP | H02-45123 A | 2/1990 |
| JP | H05-305653 A | 11/1993 |
| JP | 2000-043129 A | 2/2000 |
| JP | 2013-208834 A | 10/2013 |
| JP | 2014-069441 A | 4/2014 |
| WO | 2010/003853 A1 | 1/2010 |
| WO | 2013/099108 A1 | 7/2013 |

OTHER PUBLICATIONS

Feb. 10, 2015 International Search Report issued in International Patent Application No. PCT/JP2014/005577.

* cited by examiner

A-A section

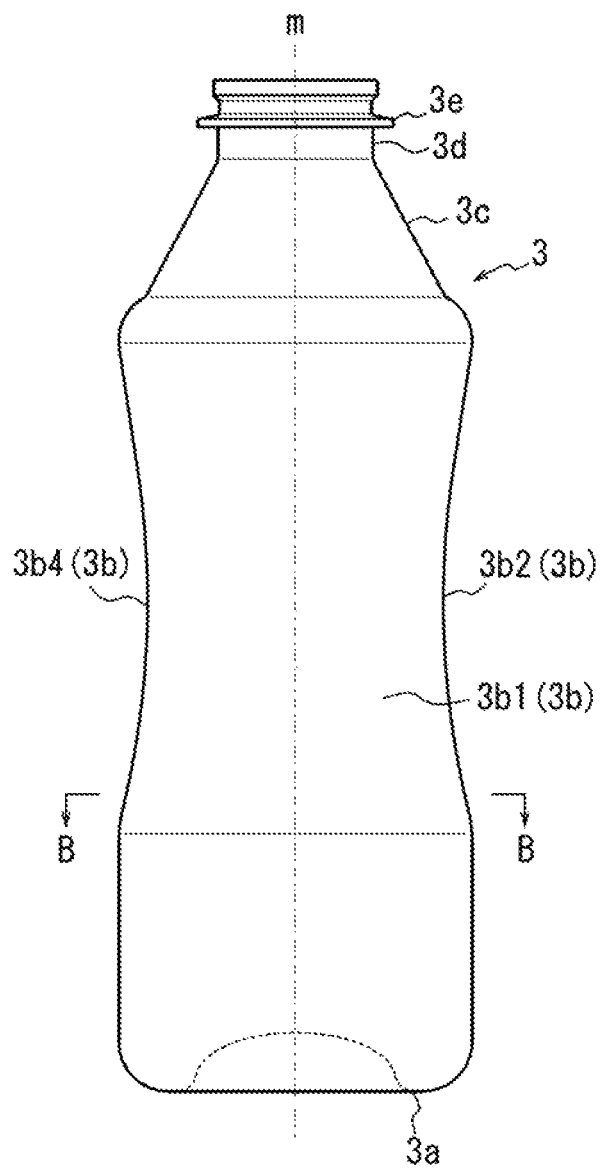

B-B section

BLOW MOLDING MOLD

TECHNICAL FIELD

The present disclosure relates to a blow molding mold employed in a blow molding device that uses a liquid as a pressurized fluid when molding a preform into a container.

BACKGROUND

Synthetic resin bottles, representatives of which are polyethylene terephthalate (PET) bottles and polypropylene (PP) bottles, are used in various fields, such as beverages, foods, cosmetics, and so forth. Such a container is generally formed in a predetermined shape by fitting a preform in a blow molding mold and by supplying a pressurized fluid from a blow molding device into the preform. The resin preform has been formed in a bottomed tubular shape by, for example, injection molding.

One example of such a blow molding device is the one that uses air or a liquid as the pressurized fluid that is to be filled into the preform. In this case, by using a content liquid, such as a beverage, a cosmetic product, and a pharmaceutical product, that is to be filled in a final product as the liquid, the step of filling the content liquid to the container may be omitted, and the production process and the configuration of the blow molding device may be simplified. Patent Literature 1, for example, describes a method of molding a plastic container, the method including placing a preform, after heated to a predetermined, temperature, in a blow mold and stretch the preform in the blow mold by using a stretching rod, and subsequently filling a liquid, after heated to a predetermined temperature, into the stretched preform to expand the preform, thereby molding the plastic container whose outer shape conforms to an inner circumferential surface the blow mold.

CITATION LIST

Patent Literature

PTL 1: JP 2000043129A

SUMMARY

Technical Problem

In cases where, as in Patent Literature 1, a liquid is used as the pressurized fluid, it is necessary to define head space in an upper portion of the container to prevent the spill of the liquid, when the container is removed from the blow molding mold. One way to do that is, for example, to mold the container, subsequently cause as trunk of the container to undergo volume reduction and deformation by bringing an inside of the container to a reduced pressure condition, by drawing back (sucking back) a part of the liquid, filled into the container into a supplier of the liquid or by withdrawing a stretching rod, which is used to stretch the preform, from the container filled with the liquid, and subsequently introduce air into the container to restore the original shape.

However, depending on the shape and thickness of the container, not only the trunk but also a shoulder and a bottom might undergo volume reduction and deformation. In this case, even when air is introduced, the original shape is sometimes not restored, and the container remains deformed by depression. The deformation by depression may be a cause of variation in the amount of the content liquid and is also undesirable in terms of appearance. To address the above problem, an attempt has been made to provide, in the trunk of the container, a reduced pressure absorbing panel that is easily deformed to undergo volume reduction. However, in many cases, providing a reduced pressure absorbing panel is not feasible due to design requirements, and a novel solution has been sought for.

The present disclosure is to solve the above problem, and the present disclosure is to provide a novel, blow molding mold that prevents, in molding of a preform into a container by a blow molding, device using a liquid as the pressurized fluid, the problem that the container might remain deformed by depression, even when the container undergoes volume reduction and deformation to define the head space.

Solution to Problem

One of aspects of the present disclosure resides in a blow molding mold adapted to be mounted to a blow molding device and having a cavity surface on an inner side thereof, wherein a preform having a bottomed tubular shape is fittable in the blow molding mold, and the blow molding device has a pressurized liquid supply function of supplying a pressurized liquid through a blow nozzle connected to a mouth tubular portion of the preform to stretch the preform toward the cavity surface to thereby mold a container and also has a head space defining function of defining head space in the container by drawing back a part of the liquid filled into the container through the blow nozzle or by withdrawing a stretching rod, which is used to stretch the preform in a longitudinal direction, from the container filled with the liquid, and wherein the cavity surface includes a bottom forming surface, a trunk forming surface, a shoulder forming surface, and a mouth forming surface that correspond to external shapes of a bottom, to trunk, a shoulder, and to mouth of the container, respectively, and the trunk forming surface includes a flattened portion that, in a transverse section thereof, has a flattened shape.

The blow molding mold according to the present disclosure is especially effective when a border area between the bottom forming surface and the trunk forming surface and a border area between the trunk forming surface and the shoulder forming surface both, in transverse sections, have a square shape.

Advantageous Effect

Since, in the blow molding mold according to the present disclosure, the cavity surface includes the bottom forming surface, the trunk forming surface, the shoulder forming surface, and the mouth forming surface, and the trunk forming surface includes a flattened portion that, in the transverse section, has a flattened shape, opposing surfaces on sides of the container that are located closer to the center axis are ready to be deformed toward, each other in a flattened portion of the container that is to be formed in conformity with the flattened portion of the cavity surface. Accordingly, even when the inside of the container is brought to a reduced pressure condition to define the head space, by drawing hack a part of the liquid filled into the container through the blow nozzle or by withdrawing the stretching rod, which is used to stretch the preform in the longitudinal direction, from the container filled with the liquid, the flattened portion of the container is preferentially deformed. As a result, volume reduction and deformation are prevented from progressing across the shoulder and the bottom, and deformation by depression is prevented.

When the border area between the bottom forming surface and the trunk forming surface and the border area between the trunk forming surface and the shoulder forming surface both, in the transverse sections, have a square shape, and when the trunk forming surface, in the transverse section, also has a square shape throughout the longitudinal direction, any corners and any surfaces in the square-shaped trunk of the container have substantially the same rigidity. Accordingly, volume reduction and deformation are very likely to occur in an unintended portion. On the other hand, even when the border area between the bottom forming surface and the trunk forming surface and the border area between the trunk forming surface and the shoulder forming surface both, in the transverse sections, have a square shape, when the aforementioned flattened portion of the cavity surface is provided, the flattened portion of the container that is to be formed in conformity with the flattened portion of the cavity surface is preferentially deformed, and this is notably effective for preventing deformation by depression.

BRIEF DESCRIPTION OF THE DRAWINGS

In the accompanying drawings:

FIG. 3A is a side view of a container having, an external shape conforming to a cavity surface of the blow molding mold illustrated in FIG. 1;

DETAILED DESCRIPTION

Figure 1:
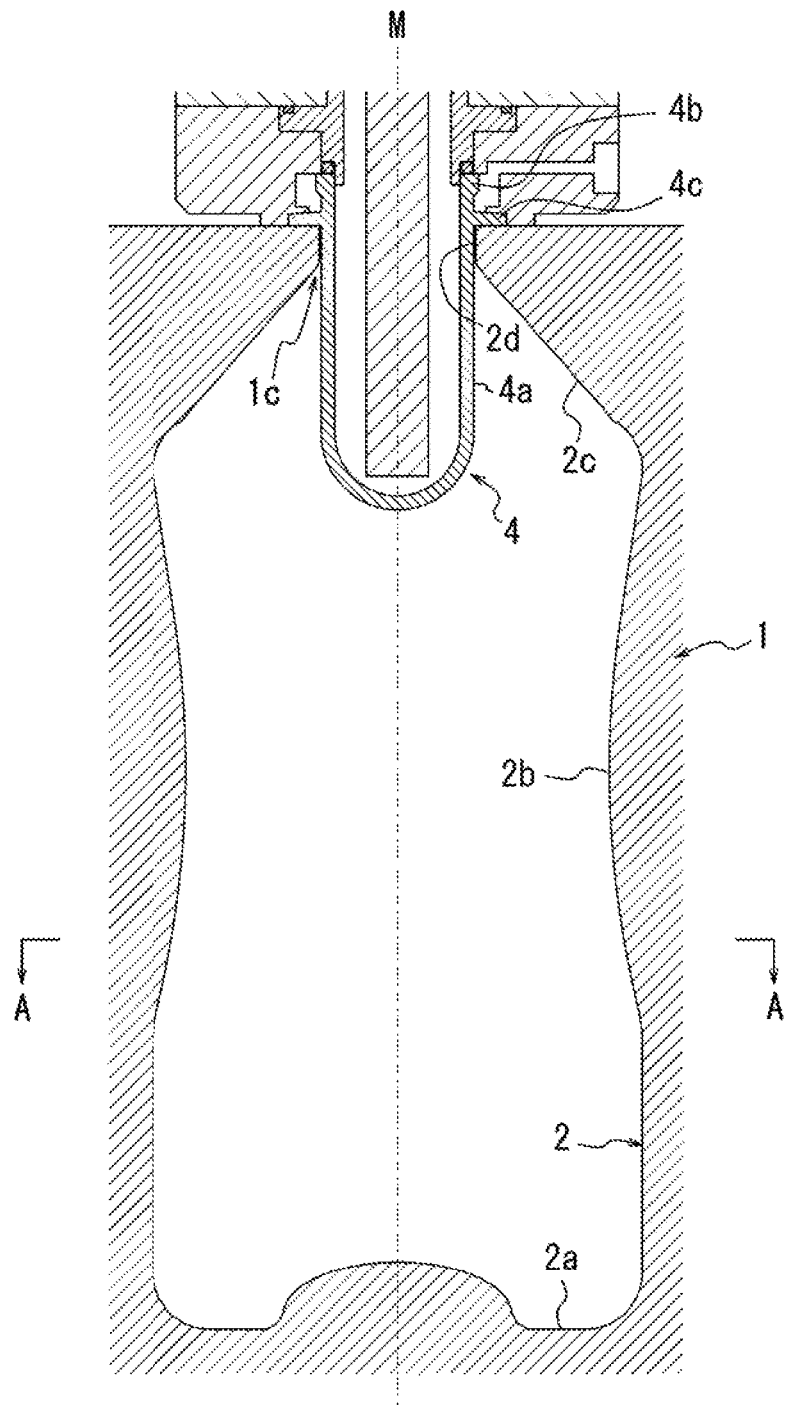
FIG. 1 is a sectional view illustrating a part of a blow molding mold, together with a preform and a blow molding device, according to one of embodiments of the present disclosure.

The following describes one of embodiments of the present disclosure in more detail by way of illustration with reference to the drawings. The term longitudinal direction herein refers to a direction extending along the center axis M of a cavity surface included in a blow molding mold illustrated in FIG. 1, and the term transverse direction refers to a direction extending along a perpendicular surface with respect to the center axis M.

Reference numeral 1 in FIG. 1 denotes a blow molding mold (hereinafter, called the mold) according to one of embodiments of the present disclosure. On the inner side of the metal mold 1, a cavity surface 2, which is to define a desired external shape of a container, is formed.

Figure 3B:
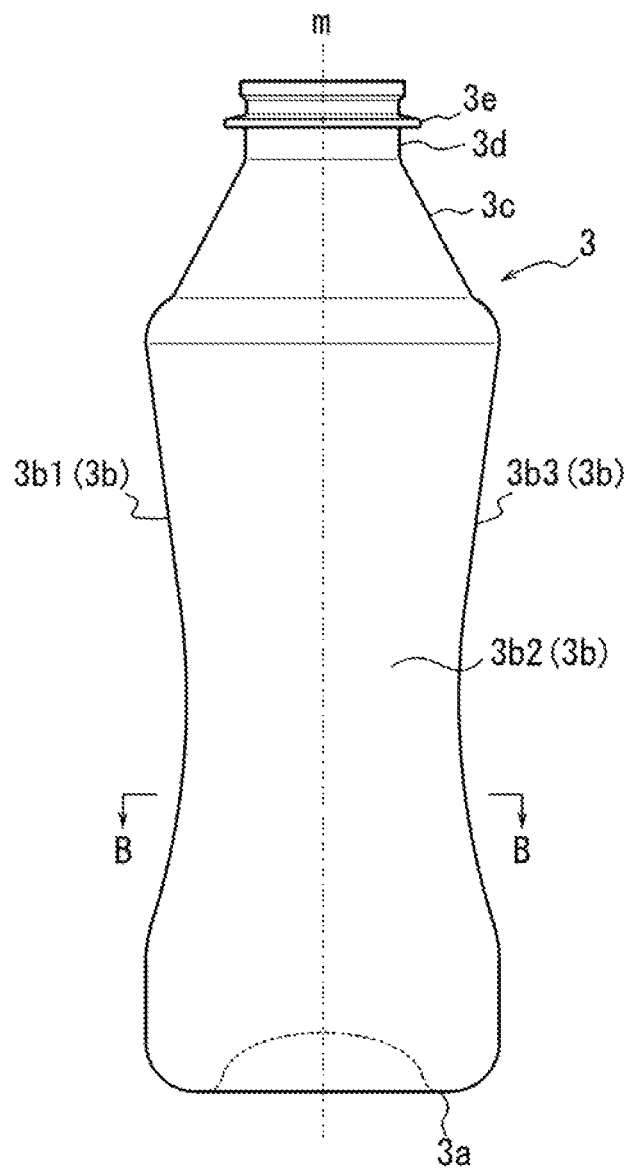
FIG. 3B is a side view taken from a direction 90 degrees different from FIG. 3A about the center axis of the container.
Figure 4A:
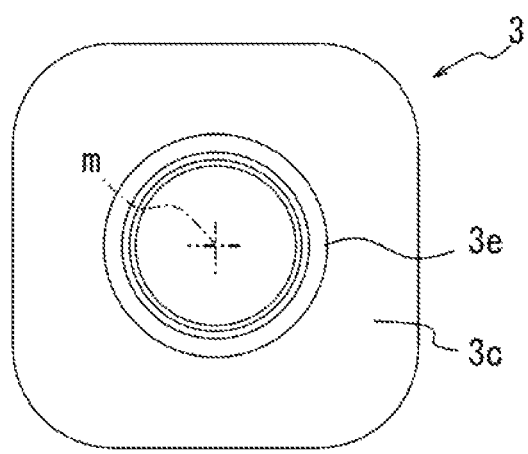
FIG. 4A is a plan view of the container illustrated in FIGS. 3A and 3B.
Figure 4B:
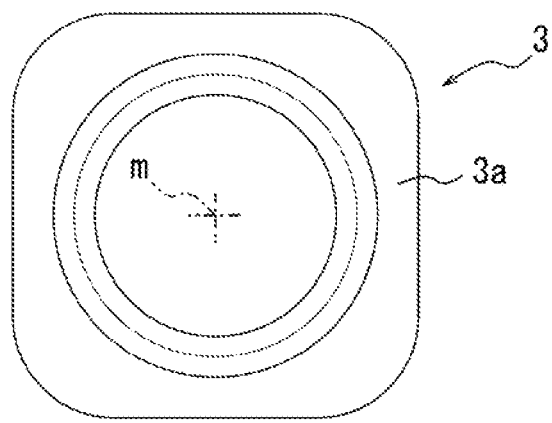
FIG. 4B is a bottom view of the container illustrated in FIGS. 3A and 3B.
Figure 5:
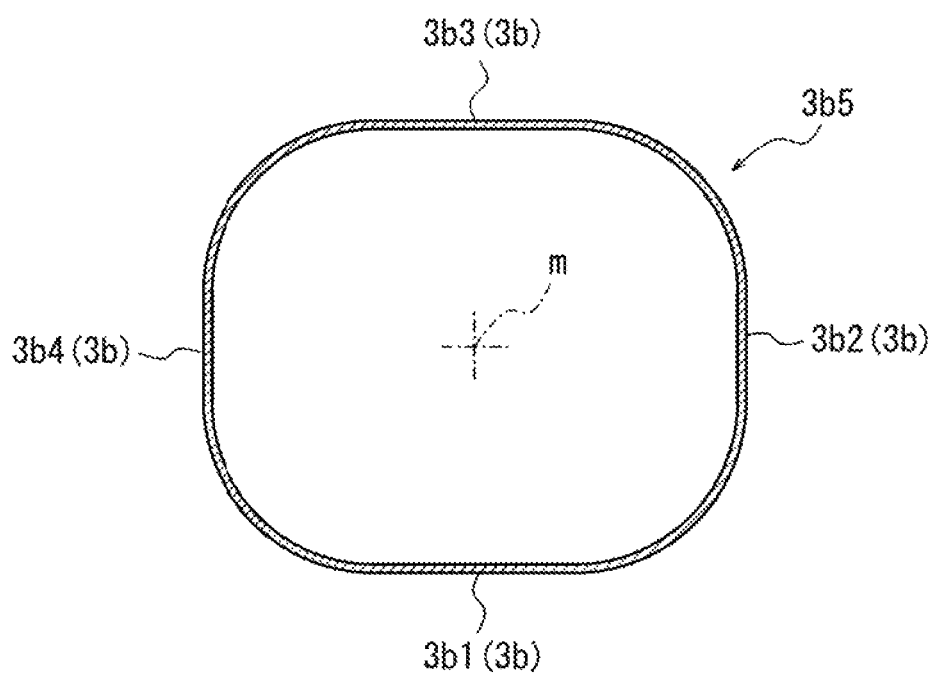
FIG. 5 is a sectional view taken along a line B-B illustrated in FIGS. 3A and 3B.

The cavity surface 2 according to the present embodiment has a shape corresponding to the external shape of the container 3 illustrated in FIGS. 3A, 3B, 4A, 4B, and 5. The container 3 includes: a bottom 3a which has a middle portion that is concave toward the inner side of the container 3 and which is generally square-shaped in the plan view; a trunk 3b which extends upward from an outer edge of the bottom 3a while being curved to the inner side of the container 3; a shoulder 3c which extends upward from the trunk 3b in a manner such that the diameter is reduced from the trunk 3b and which is generally square-shaped in the plan view a cylindrical mouth 3d which extends upward from the shoulder 3c; and a neck ring 3e which extends to the outer side in the radial direction from the mouth 3d. The bottom 3a and the shoulder 3c, which are both square-shaped, are arranged without being warped in the circumferential direction with respect to the center axis in of the container 3. The trunk 3b includes four trunk walls 3b1 to 3b4 that connect four sides of the square-shaped bottom 3a with the opposing four sides of the shoulder 3c and that extend while being curved to the inner side of the container 3. Although opposing two trunk walls the trunk walls 3b1 and 3b3) have the same shape, adjacent two trunk walls (e.g., the trunk walls 3b1 and 3b2) differ from each other in terms of a longitudinal position at which the trunk wall is located closest to the inner side of the container 3 and in terms of the degree of curvature as illustrated in FIGS. 3A and 3B. Consequently, as illustrated in FIG. 5, a flattened portion 3b5 that, in the transverse section, has a flattened shape is formed in the trunk 3b.

As illustrated in FIG. 1, the aforementioned cavity surface 2 corresponding to the external shape of the container 3 includes a bottom forming surface 2a, a trunk forming surface 2b, a shoulder forming surface 2c, and a mouth forming surface 2d that correspond to the bottom 3a, the trunk 3b, the shoulder 3c, and the mouth 3d of the container 3, respectively. The trunk forming surface 2b includes trunk forming surface portions 2b1 to 2b4 in correspondence with the four trunk walls 3b1 to 3b4 of the container 3. Furthermore, a flattened portion 2b5 of the cavity surface 2 is provided in correspondence with the flattened portion 3b5 of the container 3.

Figure 2:
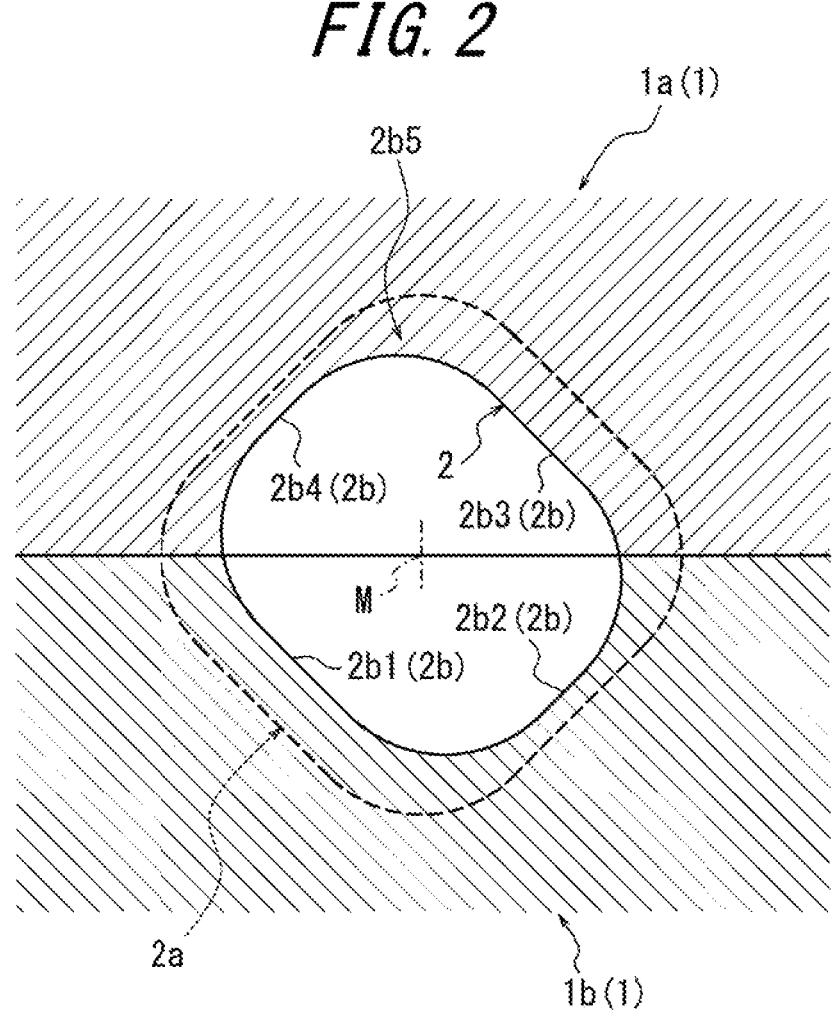
FIG. 2 is a sectional view taken along a line A-A illustrated in FIG. 1.

The mold 1 includes a plurality of mold segments formed by segmenting the cavity surface 2, and the mold segments are displaceable in a direction away from each other. As illustrated in FIG. 2, the mold 1 according to the present embodiment includes three mold segments in total, that is to say, two mold segments 1a and 1b that are to be joined on a perpendicular surface including the center axis M and one mold segment (not illustrated) that is to be joined on the lower side relative to the mold segments 1a and 1b.

As illustrated in FIG. 1, the mold 1 is provided on an upper surface thereof with an orifice 1c. In the orifice 1c, a bottomed tubular preform 4, made of a synthetic resin, such as polypropylene (PP), is fitted. The preform 4 in the present embodiment is shaped to include a test-tube shaped main body portion 4a, a cylindrical mouth tubular portion 4b integrally provided on an upper end of the main body portion 4a, and a neck ring 4c integrally provided in a lower end portion of the mouth tubular portion 4b.

Figure 6:
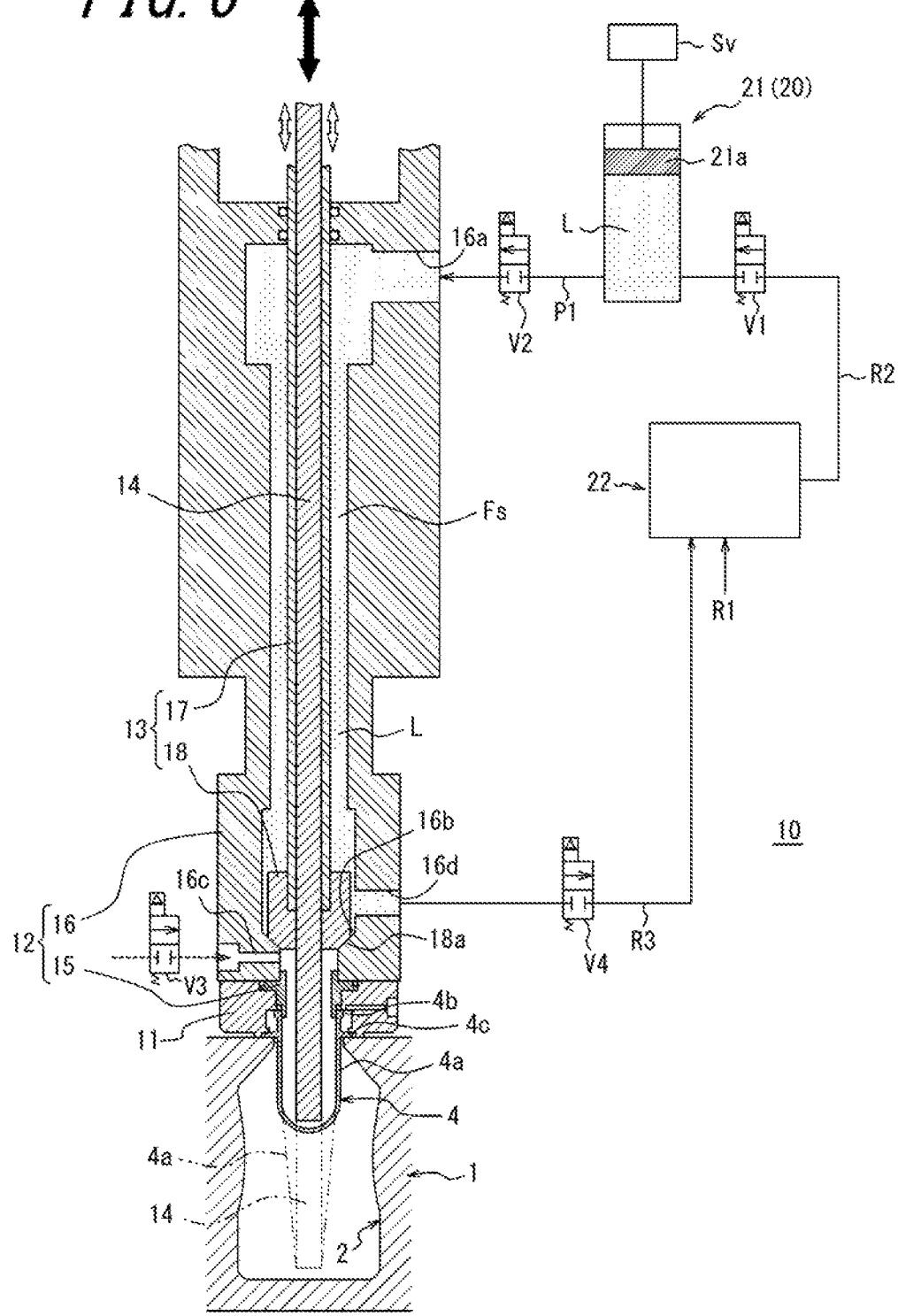
FIG. 6 is a schematic view illustrating the entire blow molding device illustrated in FIG. 1.

The mold 1 configured as described above may be mounted to, for example, a blow molding device 10 configured as illustrated in FIG. 6. The blow molding device 10 in the present embodiment includes a partition member 11, a blow nozzle 12, a seal body 13, and a stretching rod 14 and is connected to a pressurized liquid supply unit 20 and a liquid regulator 22 provided as auxiliary equipment.

The partition member 11 has a lower end portion that abuts against the neck ring 4c of the preform 4 from above to maintain a fitted position of the preform 4.

The blow nozzle 12 includes a tubular piece 15 and a supply tubular portion 16. The tubular piece 15 has a hollow shape and is connected to the mouth tubular portion 4b of the preform 4 in a liquid tight manner. The supply tubular portion 16 also has a hollow shape and is coupled, on the lower side thereof, to the tubular piece 15 and provided, on the upper side thereof, with an introduction path 16a for a liquid L used to stretch the preform 4. The supply tubular portion 16 also includes, on an inner circumferential surface of a lower portion thereof, a tapered seal stepped portion 16b whose diameter is decreased downward. Below the seal stepped portion 16b, provided is a vent hole 16c through which the inside of the supply tubular portion 16 communicates with the outside, and the vent hole 16c is configured to be opened and closed by a valve V3. In the blow nozzle 12, a flow path 16d for circulating the liquid L is also provided.

The seal body 13 is located inside the supply tubular portion 16 and is displaceable in upward and downward directions. The seal body 13 includes a long and narrow tubular body 17 and a seal tubular piece 18 assembled coaxially to a tip portion of the tubular body 17. The tubular body 17 and the seal tubular piece 18 may be displaced in upward and downward directions together. An outer circumferential edge portion of a lower end surface of the seal tubular piece 18 is chamfered to form a tapered edge portion 18a.

The stretching rod 14 extends through the tubular body 17 and the seal tubular piece 18 of the seal body 13 and is displaceable in upward and downward directions independently of the seal body 13.

Figure 7:
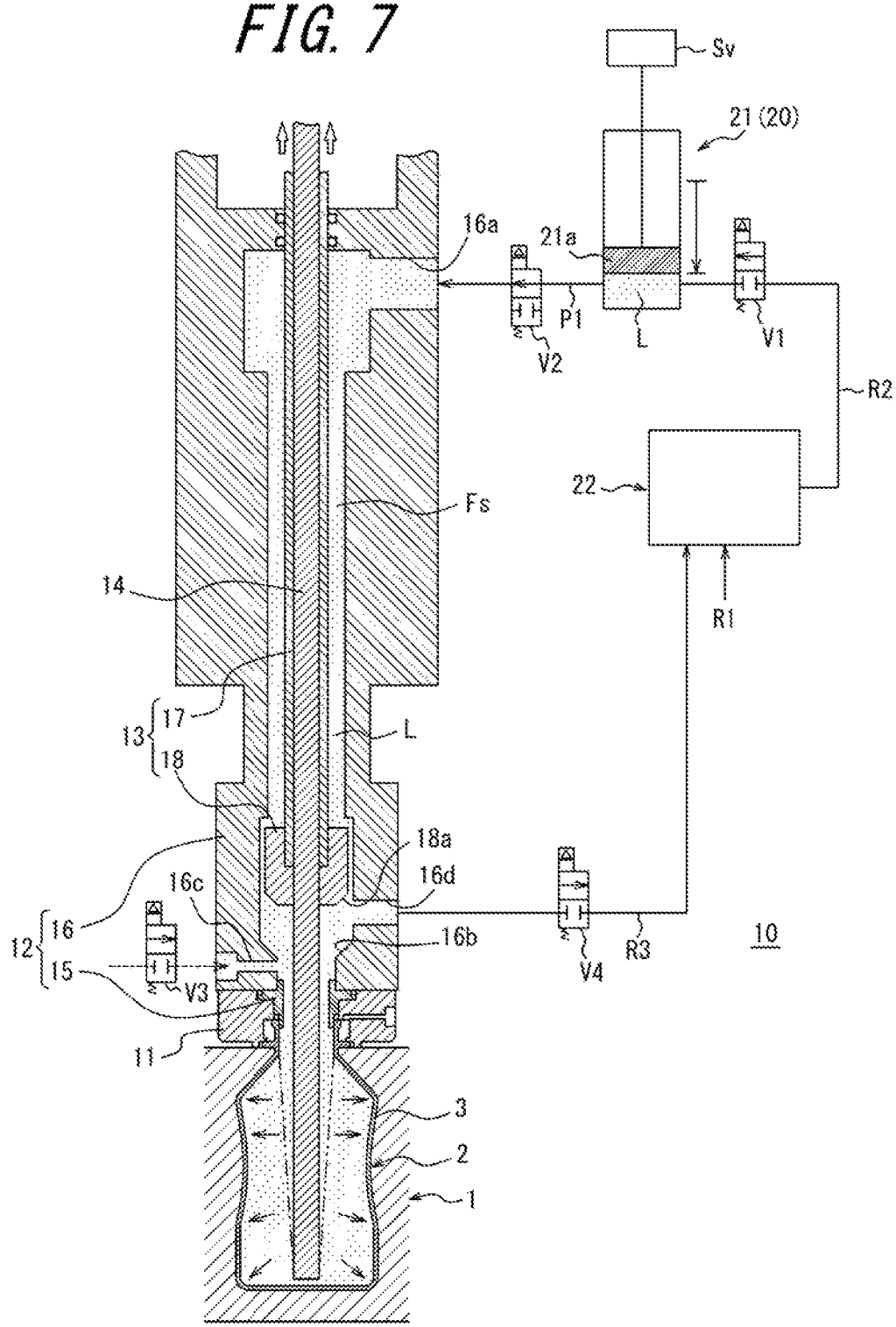
FIG. 7 is a schematic view illustrating, in comparison with FIG. 6, a state where a pressurized liquid is supplied to a preform.

Herein, with the blow nozzle 12 and the seal body 13, in the blow nozzle 12, a cylindrical in-nozzle supply path Fs is formed in communication with the inside of the preform 4. As illustrated in FIG. 6, by displacing the seal body 13 downward to abut the tapered edge portion 18a of the seal tubular piece 18 against the seal stepped portion 16b of the supply tubular portion 16, the communication of the in-nozzle supply path Fs with the inside of the preform is brought to a closed state. As illustrated in FIG. 7, by displacing the seal body 13 upward, the communication is brought to an opened state.

The pressurized liquid supply unit 20 includes a plunger pump 21 in which a plunger 21a is inserted, and operation of the plunger 21a is controlled by a servo mechanism Sv including a servo motor (which is not illustrated). The pressurized liquid supply unit 20 is connected to the introduction path 16a of the blow nozzle 12 through a pipe P1, and the pressurized liquid supply unit 20 is configured to supply the liquid L to the in-nozzle supply path Fs by displacing the plunger 21a downward and is also configured to draw back the liquid L in the in-nozzle supply path Es by displacing the plunger 21a upward. In the pipe P1, a valve V2, used for opening and closing the path, is disposed.

The liquid regulator 22 has functions of inducting the liquid L in the in-nozzle supply path Fs through a pipe R3 communicating with the flow path 16d, replenishing additional liquid L through the pipe R1 as needed, and heating the liquid L to a desired temperature and subsequently supplying the liquid L to the pressurized liquid supply unit 20 through a pipe R2. This allows the liquid L in the in-nozzle supply path Es to be circulated while being maintained at a constant temperature. In the pipes R2 and R3, valves V1 and V4, used for opening and closing the flow channel, are disposed.

In the following, a description is given of a process of blow molding the preform 4 by using, the mold 1 and the blow molding device 10 configured as above, with reference to FIGS. 6 to 9.

Firstly, as illustrated in FIG. 4, the preform 4 is fitted to the mold 1 and the mold 1 is closed, and the tubular piece 15 of the blow molding device 10 is connected to the mouth tubular portion 4b of the preform 4. The valves V1, V3, and V4 are in the closed state. Then, as indicated by a two-dot chain line in the figure, the stretching rod 14 is displaced downward to stretch the preform 4 in the longitudinal direction.

Subsequently, as illustrated in FIG. 7, the seal body 13 is displaced upward to bring the in-nozzle supply path Fs to the opened state, and the valve V2 is brought to the opened state. Then, the plunger 21a of the plunger pump 21 is displaced downward. By doing so, the pressurized liquid L is supplied into the preform 4, thereby stretching the longitudinally stretched preform 4 toward the cavity surface 2 of the mold 1 to mold the container 3 (pressurized liquid supply function).

Figure 8:
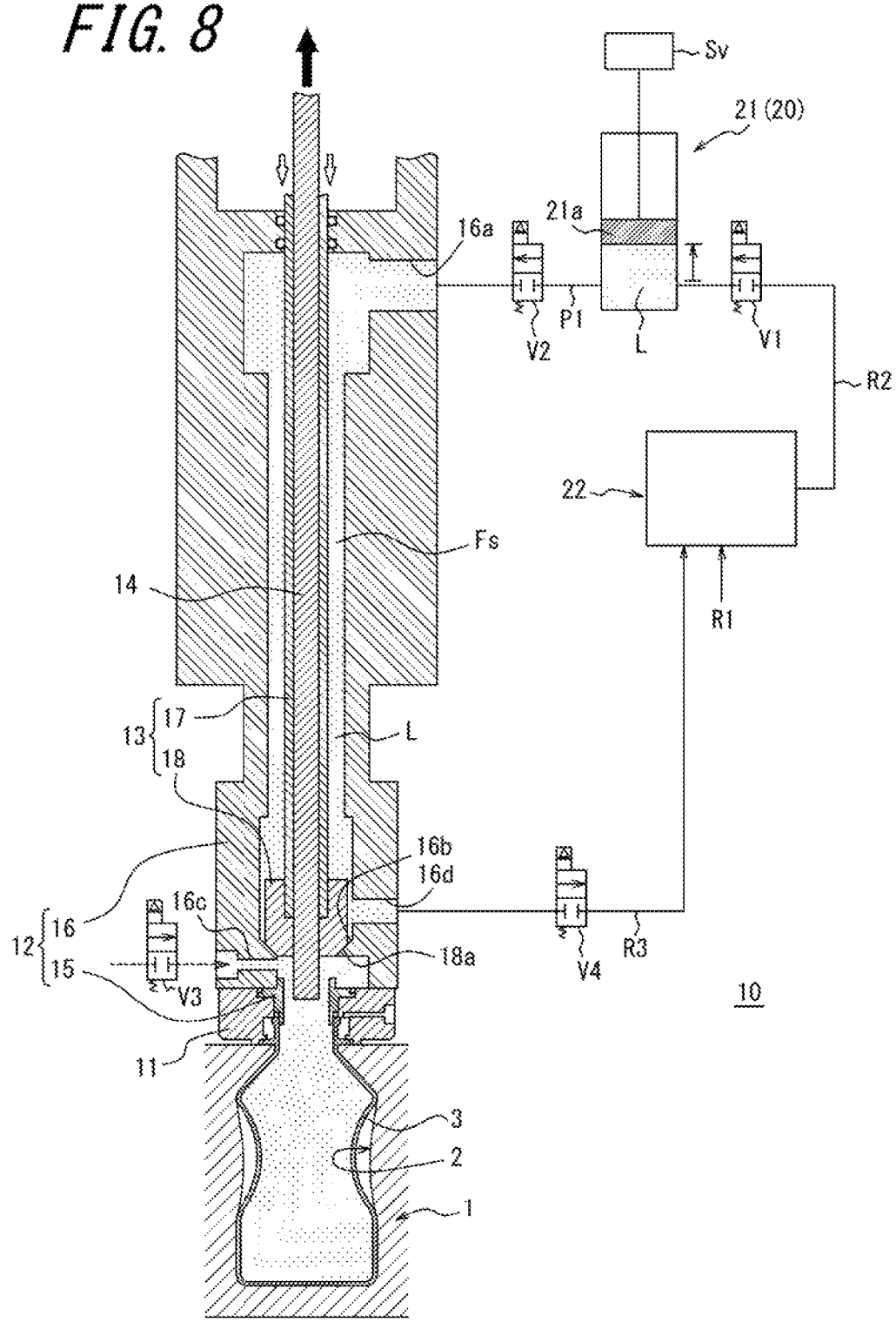
FIG. 8 is a schematic view illustrating, in comparison with FIG. 7, a state where a container undergoes volume reduction and deformation by drawing back a part of the liquid filled into the container and by withdrawing a stretching rod from the container filled with the liquid.

After the container 3 is molded as described above, the plunger 21a is displaced upward as illustrated in FIG. 8 (note that in this state the seal body 13 is displaced upward, and the in-nozzle supply path Fs is in the opened state as illustrated in FIG. 7), a part of the liquid filled in the container 3 is drawn back into the plunger pump 21 through the blow nozzle 12 to allow the container 3 to undergo volume reduction and deformation. Furthermore, by displacing the seal body 13 downward to bring the in-nozzle supply path to the closed state and by displacing the stretching rod 14 upward, the container 3 undergoes further volume reduction and deformation.

Herein, since the mold 1 includes the flattened portion 2b5 that, in the transverse section, has a flattened shape as illustrated in FIG. 2, the flattened portion 3b5 conforming to the flattened portion 2b5 is formed in the container 3 as illustrated in FIG. 5. Consequently, in the flattened portion 3b5, the trunk walls 3b1 and 3b3, which are located closer to the center axis m of the container 3, are preferentially deformed toward each other, and volume reduction and deformation in an unintended portion are prevented.

Figure 9:
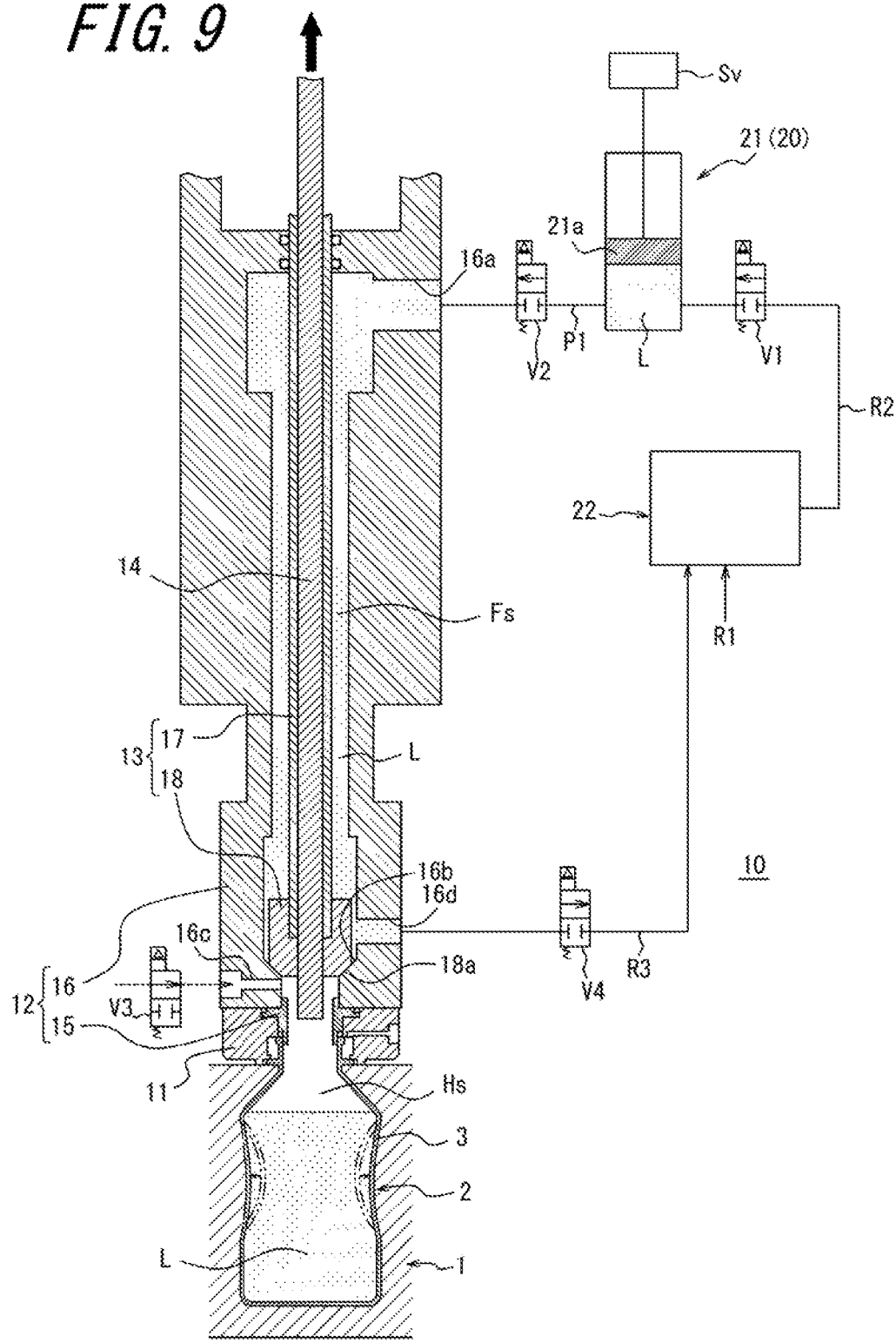
FIG. 9 is a schematic view illustrating, in comparison with FIG. 8, a state where air is introduced into the container to define head space.

Subsequently, as illustrated in FIG. 9, the valve V3 is brought to the opened state to be exposed to the atmosphere, and thus, the container 3 is restored. Additionally, the container 3 may also be restored by introducing pressurized gas through the vent hole 16c. As a result, head space Hs is defined in the container 3 (head space defining function). Additionally, the container 3 is molded into the final shape when being removed from the mold 1 (the capacity of the container 3 may change more or less before and after removal from the mold 1). Accordingly, the head space Hs at this stage is adjusted to the volume that anticipates the final shape.

Subsequently, although not illustrated, the blow nozzle 12 is displaced upward to disconnect the blow nozzle 12 from the container 3, and the mold 1 is opened to remove the container 3 filled with the liquid L. After that, the mouth 3d is sealed by a cap or the like to obtain a final product.

EXAMPLES

As described below, a mold (Example mold) used to mold the container illustrated in FIGS. 3A, 3B, 4A, 4B, and 5 and a mold (Comparative Example mold) used to mold a container including the bottom and the shoulder that are square-shaped similarly to the container illustrated in FIGS. 3A, 3B, 4A, 4B, and 5 and also including a perpendicular trunk were prepared, and a predetermined number of containers were molded to study frequency at which the molded containers remained deformed by depression. The Example mold and the Comparative Example mold were fitted to the same blow molding device. The result was that the molded containers remained deformed by depression around a border between the trunk and the shoulder at a frequency of 90% or more in molding by using the Comparative Example mold, whereas such deformation did occur by using the Example mold. The result indicates that providing the flattened portion that, in the transverse section, has a flattened shape in the trunk forming surface is effective for preventing deformation by depression.

The blow molding mold according to the present disclosure is not limited to the above embodiment, and various changes may be made within the scope of the claims. For example, although the flattened portion 2b5 of the cavity surface 2 produces a rectangular shape whose corners are rounded, an elliptical shape may also be envisaged. Furthermore, although in the aforementioned blow molding device 10, to define the head space Hs, the container 3 was deformed to undergo volume reduction by displacing the plunger 21a upward to draw back a part of the liquid, filled into the container 3, into the plunger pump 21 through the blow nozzle 12 and also by displacing the stretching rod 14 upward from the container 3 filled with the liquid L, only one of these processes may also be performed. Moreover, stretching in the longitudinal direction by using the stretching rod 14 may be omitted, and the preform 4 may be stretched simply by supplying the pressurized liquid L into the preform 4.

INDUSTRIAL APPLICABILITY

The present disclosure provides a novel blow molding mold that prevents, in molding of a preform into a container by a blow molding, device that uses a liquid as the pressurized fluid, deformation by depression even when the container undergoes volume reduction and deformation to define head space.

REFERENCE SIGNS LIST

1 Mold
1a, 1b Mold segment
1c Orifice
2 Cavity surface
2a Bottom forming surface
2b Trunk forming surface
2c Shoulder forming surface
2d Mouth forming surface
2b1 to 2b4 Trunk forming surface portion
2b5 Flattened portion of cavity surface
3 Container
3a Bottom
3b Trunk
3c Shoulder
3d Mouth
3e Neck ring
3b1 to 3b4 Trunk wall
3b5 Flattened portion of container
4 Preform
4a Main body portion
4b Mouth tubular portion
4c Neck ring
10 Blow molding device
11 Partition member
12 Blow nozzle
13 Seal body
14 Stretching rod
15 Tubular piece
16 Supply tubular portion
16a Introduction path
16b Seal stepped portion
16c Vent hole
16d Flow path
17 Tubular body
18 Seal tubular piece
18a Tapered edge portion
20 Pressurized liquid supply unit
21 Plunger pump
21a Plunger
22 Liquid regulator
Fs In-nozzle supply path
Hs Head space
L Liquid
M Center is of cavity surface
m Center axis of container
P1 Pipe
R1 Pipe
R2 Pipe
R3 Pipe
SV Servo mechanism
V1 Valve
V2 Valve
V3 Valve
V4 Valve

The invention claimed is:

1. A blow molding mold adapted to be mounted to a blow molding device and having a cavity surface on an inner side thereof, wherein a preform having a bottomed tubular shape is fittable in the blow molding mold, and the blow molding device has a pressurized liquid supply function of supplying a pressurized liquid through a blow nozzle connected to a mouth tubular portion of the preform to stretch the preform toward the cavity surface to thereby mold a container and also has a head space defining function of defining head space in the container by drawing back a part of the liquid filled into the container through the blow nozzle or by withdrawing a stretching rod, which is used to stretch the preform in a longitudinal direction, from the container filled with the liquid, and wherein the cavity surface includes a bottom forming surface, a trunk forming surface, a shoulder forming surface, and a mouth forming surface that correspond to external shapes of a bottom, a trunk, a shoulder, and a mouth of the container, respectively, the trunk forming surface includes a flattened portion that, in a transverse section thereof, has a flattened shape, and trunk walls of the trunk forming surface are located closer to a center axis in the flattened portion than in other portions of the trunk, the trunk walls of the trunk forming surface adapted to deform toward each other.

2. The blow molding mold of claim 1, wherein a border area between the bottom forming surface and the trunk forming surface and a border area between the trunk forming surface and the shoulder forming surface both, in transverse sections thereof, have a square shape.

3. The blow molding mold of claim 1, wherein the trunk forming surface includes four trunk walls that connect four sides of the square-shaped bottom forming surface with opposing four sides of the shoulder forming surface and that extend while being curved to the inner side of the blow molding mold, opposing two trunk walls have the same shape, adjacent two trunk walls differ from each other in terms of a longitudinal position at which the trunk wall is located closest to the inner side of the blow molding mold and in terms of the degree of curvature.

4. The blow molding mold of claim 1, wherein the flattened portion of the trunk forming surface, in the transverse section thereof, has a rectangular shape with rounded corners or an elliptical shape, wherein said rectangle or ellipse has a smaller width than the width of a transverse section of the trunk forming surface outside the flattened portion of the trunk forming surface.

5. A process of blow molding the preform by using the blow molding mold and the blow molding device according to claim 1, comprising:
    fitting the preform to the blow molding mold,
    closing the blow molding mold,
    connecting the tubular piece of the blow molding device to the mouth tubular portion of the preform,
    supplying the pressurized liquid into the preform, thereby stretching the longitudinally stretched preform toward the cavity surface of the blow molding mold to mold the container,
    drawing back a part of the liquid filled in the container through the blow nozzle to allow the container to undergo volume reduction and deformation,
    forming a flattened portion of the container conforming to the flattened portion of the blow molding mold in the container, and
    defining the head space in the container, the trunk walls of the trunk forming surface being deformed toward each other.

6. The process of blow molding the preform according to claim 5, wherein the container comprises a trunk including four trunk walls that connect four sides of a square-shaped bottom with opposing four sides of a shoulder and that extend while being curved to an inner side of the container, opposing two trunk walls have the same shape, adjacent two trunk walls differ from each other in terms of a longitudinal position at which the trunk wall is located closest to the inner side of the container and in terms of the degree of curvature.

7. The process of blow molding the preform according to claim 5, wherein the flattened portion of the trunk, in the transverse section thereof, has a rectangular shape with rounded corners or an elliptical shape, wherein said rectangle or ellipse has a smaller width than the width of a transverse section of the trunk outside the flattened portion of the trunk.

8. A blow molding system including the blow molding mold of claim 1, the blow molding system further comprising:
    the blow molding device including
        the blow nozzle configured to connect to the mouth tubular portion of the preform, and
        a pressurized liquid supply configured to supply the pressurized liquid through the blow nozzle to the preform to stretch the preform toward the cavity surface to thereby mold the container, wherein
    the pressurized liquid supply is configured to draw back a part of the liquid filled into the container through the blow nozzle or by withdrawing a stretching rod to form head space in the container.

* * * * *